(12) United States Patent
Okamoto

(10) Patent No.: US 9,014,604 B2
(45) Date of Patent: Apr. 21, 2015

(54) ROLLER DEVICE, IMAGE FORMING APPARATUS, AND METHOD FOR MANUFACTURING ROLLER

(75) Inventor: Shohtaroh Okamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 79 days.

(21) Appl. No.: 13/818,349

(22) PCT Filed: Jun. 20, 2011

(86) PCT No.: PCT/JP2011/064027
§ 371 (c)(1),
(2), (4) Date: Feb. 22, 2013

(87) PCT Pub. No.: WO2012/026190
PCT Pub. Date: Mar. 1, 2012

(65) Prior Publication Data
US 2013/0164052 A1    Jun. 27, 2013

(30) Foreign Application Priority Data

Aug. 24, 2010    (JP) ................................. 2010-186726

(51) Int. Cl.
*G03G 15/01*    (2006.01)
*F16C 13/00*    (2006.01)
*G03G 15/16*    (2006.01)

(52) U.S. Cl.
CPC ............ *G03G 15/0189* (2013.01); *F16C 13/00* (2013.01); *F16C 2208/00* (2013.01); *G03G 15/1615* (2013.01); *Y10T 29/49556* (2013.01)

(58) Field of Classification Search
CPC .................................................. G03G 15/1615

USPC ........ 399/302, 303, 308, 117; 492/16, 47, 18; 29/895.22; 403/308

See application file for complete search history.

(56) References Cited

U.S. PATENT DOCUMENTS 4,165,551 A * 8/1979 Rosseau .......................... 15/179
5,993,101 A * 11/1999 Kohno et al. .................. 403/305

(Continued)

FOREIGN PATENT DOCUMENTS

JP        3-15840        2/1991
JP        08-171310      7/1996

(Continued)

OTHER PUBLICATIONS

International Search Report for corresponding International Application No. PCT/JP2011/064027 mailed Jul. 19, 2011.

*Primary Examiner* — Robert Beatty
(74) *Attorney, Agent, or Firm* — Renner, Otto, Boisselle & Sklar, LLP

(57) ABSTRACT

A roller device includes a roller main body, a shaft member, flanges, a position restricting member, a plate-shaped member, a biasing member, and a securing member. The shaft member is inserted into the roller main body and the flanges in contact with both ends of the roller main body. The position restricting member is secured to the shaft member at an end portion side of the shaft member with respect to the flange. The position restricting member restricts an axial position of the flange. Movement of the plate-shaped member toward the end portion side in an axial direction is restricted by the position restricting member. The biasing member biases the flange toward a center side in the axial direction. The securing member is disposed at the end portion side of the shaft member with respect to the plate-shaped member. The securing member engages the position restricting member.

16 Claims, 9 Drawing Sheets

(56) References Cited

U.S. PATENT DOCUMENTS

| | | | |
|---|---|---|---|
| 7,016,626 B2 * | 3/2006 | Yokomori et al. | 399/117 |
| 2003/0091373 A1 | 5/2003 | Abe et al. | |
| 2007/0078045 A1 | 4/2007 | Sahara et al. | |

FOREIGN PATENT DOCUMENTS

| | | | | |
|---|---|---|---|---|
| JP | 08234626 A | * | 9/1996 | |
| JP | 11-065336 | | 3/1999 | |
| JP | 2000214727 A | * | 8/2000 | |
| JP | 2002-182527 | | 6/2002 | |
| JP | 2002182527 A | * | 6/2002 | |
| JP | 2002-296749 | | 10/2002 | |
| JP | 2002-357986 | | 12/2002 | |
| JP | 2002357986 A | * | 12/2002 | |
| JP | 2003-149951 | | 5/2003 | |
| JP | 2003-215943 | | 7/2003 | |
| JP | 2006039364 A | * | 2/2006 | |
| JP | 2006-227098 | | 8/2006 | |
| JP | 2006227098 A | * | 8/2006 | |
| JP | 2007-122022 | | 5/2007 | |
| JP | 2008275893 A | * | 11/2008 | |

* cited by examiner

ROLLER DEVICE, IMAGE FORMING APPARATUS, AND METHOD FOR MANUFACTURING ROLLER

TECHNICAL FIELD

The present invention relates to a roller device that includes a roller main body, a shaft member inserted into the roller main body, flanges that allow insertion of the shaft member and are disposed in contact with both end portions of the roller main body, and a position restricting member that is secured to the shaft member at the end portion side of the shaft member with respect to the flange and restricts an axial position of the flange, and relates to a method for manufacturing the roller device. The present invention also relates to an image forming apparatus that includes the roller device.

BACKGROUND ART

Conventionally, in a transfer roller disposed in an image forming apparatus such as a copy machine, a difference in thermal expansion coefficient between members constituting the transfer roller may cause a shift of an axial position of a flange. The shift of the axial position of the flange in the transfer roller cause a shift of an axial position of a rib formed on a transfer belt that is stretched around the transfer roller. This may cause a problem with restriction of meandering of the transfer belt.

To solve the above-described problem, various roller devices have been proposed. For example, the following roller device is disclosed (for example, see Patent Literature 1). The roller device presses a roller that restricts a position of an intermediate transfer belt toward the driven roller via a washer with a wave washer spring, a snap ring, and a similar member at a predetermined pressure. For example, the following roller device is also disclosed (for example, see Patent Literature 2). The roller device biases a belt guide member, which restricts a position of an intermediate transfer belt, in a direction where the belt guide member is consistently pressed toward an end surface of a roller by a spring.

CITATION LIST

Patent Literature

PATENT LITERATURE 1: Japanese Unexamined Patent Application Publication No. 2003-215943
PATENT LITERATURE 2: Japanese Unexamined Patent Application Publication No. 11-65336

SUMMARY OF INVENTION

Technical Problem

However, the roller devices disclosed in Patent Literatures 1 and 2 need to secure the end surface of the spring with a snap ring and a similar member in a state where a pressure is applied via a tool and a similar member by a reactive force. The reactive force corresponds to the biasing force of the spring. This makes assembly difficult.

The present invention has been made in view of the above-described circumstances, and it is an object of the present invention to provide a roller device that prevents a shift of a flange in an axial direction and is easily assembled. It is another object of the present invention to provide a method for manufacturing the roller device according to the present invention. Additionally, it is another object of the present invention to provide an image forming apparatus that employs the roller device according to the present invention.

Solution to Problem

A roller device according to the present invention includes a roller main body, a shaft member, flanges, a position restricting member, a plate-shaped member, a biasing member, and a securing member. The shaft member is inserted into the roller main body. The flanges are disposed in contact with both ends of the roller main body. The shaft member is inserted into the flanges. The position restricting member is secured to the shaft member at an end portion side of the shaft member with respect to the flange. The position restricting member restricts an axial position of the flange. The plate-shaped member is disposed between the position restricting member and the flange. Movement of the plate-shaped member toward the end portion side in an axial direction is restricted by the position restricting member. The biasing member is disposed at the flange side of the plate-shaped member. The biasing member biases the flange toward a center side in the axial direction. The securing member is disposed at the end portion side of the shaft member with respect to the plate-shaped member. The securing member engages the position restricting member.

With the present invention, the securing member is disposed at the end portion side of the shaft member with respect to the plate-shaped member and engages the position restricting member. In a state where the plate-shaped member is pushed to the flange side and the flange is biased toward the center side in the axial direction by the biasing member, engaging the position restricting member with the securing member allows securing the position restricting member (see FIGS. 7A and 7B and FIGS. 8A and 8B). This ensures facilitated assembly of the roller device.

In a state where the flange is biased toward the center side in the axial direction by the biasing member, engaging the position restricting member with the securing member allows securing the position restricting member. Thus, the flange is biased by the biasing member (see FIGS. 9A and 9B). This prevents a positional shift of the flange in the axial direction.

In the above-described configuration, the plate-shaped member may have an insertion hole that allows insertion of the position restricting member into the insertion hole.

In this case, the plate-shaped member has an insertion hole that allows insertion of the position restricting member into the insertion hole. After the position restricting member is mounted on the shaft member, inserting the position restricting member into the insertion hole of the plate-shaped member allows mounting the plate-shaped member on the shaft member (see FIGS. 6A and 6B and FIGS. 7A and 7B). This further facilitates assembly of the roller device.

In the above-described configuration, the securing member may be integrally formed with the plate-shaped member.

In this case, the securing member is integrally formed with the plate-shaped member. Thus, mounting the plate-shaped member on the shaft member also allows mounting the securing member on the shaft member (see FIGS. 6A and 6B and FIGS. 7A and 7B). This further facilitates assembly of the roller device.

In the above-described configuration, the shaft member may include both end portions that each have an approximately cylindrically-shaped through hole. The approximately cylindrically-shaped through hole passes through the end portion of the shaft member in a radial direction. The position restricting member may be an approximately cylindrically-shaped member inserted into the through hole in the shaft member and longer than a diameter of the shaft member.

In this case, the position restricting member, which is the approximately cylindrically-shaped member longer than the diameter of the shaft member, is inserted into the through hole in the shaft member. This provides a function of the position restricting member (see FIG. 2), thus providing the position restricting member with a simple configuration.

In the above-described configuration, the securing member may include a depressed portion that engages a surface of the position restricting member at a side where the surface faces the securing member.

In this case, the depressed portion that engages the surface of the position restricting member at the side where the surface faces the securing member is formed. Thus, engaging the position restricting member with the depressed portion allows securing the position restricting member (see FIGS. 7A and 7B and FIGS. 8A and 8B). This further facilitates assembly of the roller device.

In the above-described configuration, the securing member may include an inclined portion that is inclined toward the center side in the axial direction from the depressed portion toward the insertion hole in the plate-shaped member.

In this case, the securing member includes the inclined portion that is inclined toward the center side in the axial direction from the depressed portion toward the insertion hole in the plate-shaped member. Thus, sliding the position restricting member, which is constituted of the approximately cylindrically-shaped member, on the inclined portion to engage the depressed portion allows securing the position restricting member (see FIGS. 7A and 7B and FIGS. 8A and 8B). This further facilitates assembly of the roller device.

In the above-described configuration, the securing member may include a movement preventing portion. The movement preventing portion restricts movement of the position restricting member in a central axis direction. The position restricting member is engaged with the depressed portion.

In this case, the movement preventing portion, which restricts movement of the position restricting member engaged with the depressed portion in the central axis direction, is disposed. This surely prevents dropping of the position restricting member, which is formed of the approximately cylindrically-shaped member, from the through hole, which is formed in the shaft member, due to vibration of the roller device (see FIGS. 9A and 9B).

In the above-described configuration, the securing member may include a turning preventing portion that restricts turning of the position restricting member in an opposite direction of a direction to approach the inclined portion. The position restricting member is engaged with the depressed portion.

In this case, the turning preventing portion, which restricts turning of the position restricting member engaged with the depressed portion in the opposite direction of the direction to approach the inclined portion, is disposed. Thus, this surely prevents the position restricting member, which is engaged with the depressed portion, from climbing over the depressed portion (see FIGS. 9A and 9B), thus surely securing the position restricting member to the depressed portion.

In the above-described configuration, the securing member may include a turning operating portion with a structure that allows a turning force to act in a case where the securing member is turned around a central axis of the shaft member as a center.

In this case, the turning operating portion with a structure, which allows a turning force to act in a case where the securing member is turned around the central axis of the shaft member as the center, is disposed. This allows the securing member to turn around the central axis of the shaft member as the center (see FIGS. 7A and 7B and FIGS. 8A and 8B) via the turning operating portion. This further facilitates assembly of the roller device.

In the above-described configuration, the plate-shaped member and the securing member may be made of resin.

In this case, the plate-shaped member and the securing member are made of resin. This ensures facilitated manufacture of the plate-shaped member and the securing member by injection molding or similar method.

In the above-described configuration, the plate-shaped member and the securing member may be made of polyacetal.

In this case, the plate-shaped member and the securing member are made of polyacetal. This ensures the plate-shaped member and the securing member that are excellent in mechanical characteristics such as abrasion resistance and heat resistance.

In the above-described configuration, the biasing member may include three or more protruding portions that are disposed in approximately a same radial position and almost equally spaced in a circumferential direction, and the protruding portions may be in contact with the flange to bias the flange.

In this case, the biasing member includes three or more protruding portions that are in approximately the same radial position and almost equally spaced in the circumferential direction, and the protruding portions are in contact with the flange to bias the flange. This reduces sliding friction between the protruding portion and the flange (see FIGS. 7A and 7B to FIGS. 9A and 9B), thus further facilitating assembly of the roller device.

The protruding portions are in approximately the same radial position and almost equally spaced in the circumferential direction. Thus, the flange is uniformly biased in the circumferential direction (see FIGS. 9A and 9B). This surely prevents a positional shift of the flange in the axial direction.

In the above-described configuration, the biasing member may include an elastic portion and a supporting portion. The elastic portion is configured to support the protruding portion and to be elastically deformable in an axial direction. The supporting portion is disposed upright in the plate-shaped member and supports the elastic portion.

In this case, the biasing member includes the elastic portion, which supports the protruding portion and is elastically deformable in the axial direction, and the supporting portion, which is disposed upright in the plate-shaped member and supports the elastic portion. Thus, an elastic force by elastic deformation of the elastic portion, which is supported by the supporting portion disposed upright in the plate-shaped member, is applied to the protruding portion that biases the flange (see FIGS. 3A and 3B and FIGS. 9A and 9B). This provides the biasing member with a simple configuration.

A method for manufacturing the roller device according to the present invention is a method for manufacturing the roller device according to the present invention that includes: inserting the shaft member into the flange; securing the position restricting member to the shaft member; inserting the shaft member into the plate-shaped member, the biasing member, and the securing member; inserting the position restricting member into the insertion hole in the plate-shaped member; and engaging the position restricting member with the securing member.

The present invention provides advantageous effects of the roller device according to the present invention. The method sequentially performs securing the position restricting member to the shaft member, and then performs inserting the position restricting member into the insertion hole formed in the plate-shaped member, and engaging the position restricting member with the securing member, thus manufacturing the roller device (see FIGS. 5A and 5B to FIGS. 7A and 7B). This ensures facilitated manufacture of the roller device.

An image forming apparatus according to the present invention includes a plurality of rollers around which a transfer belt is stretched. The image forming apparatus forms an image on a surface of a recording medium including a recording paper. At least one roller among the plurality of rollers is the roller device according to the present invention.

The present invention provides advantageous effects of the roller device according to the present invention. The image forming apparatus includes the securing member, which is disposed at the side of the plate-shaped member away from the flange and engages the position restricting member. In a state where the plate-shaped member is pushed toward the flange side and the flange is biased toward the center side in the axial direction by the biasing member, engaging the position restricting member with the securing member allows securing the position restricting member (see FIGS. 7A and 7B and FIGS. 8A and 8B). This ensures facilitated assembly of the roller that is disposed in the image forming apparatus and around which the transfer belt is stretched.

In a state where the flange is biased toward the center side in the axial direction by the biasing member, engaging the position restricting member with the securing member allows securing the position restricting member. Thus, the flange is biased by the biasing member (see FIGS. 9A and 9B). This prevents a positional shift of the flange in the axial direction in the roller that is disposed in the image forming apparatus and around which the transfer belt is stretched.

Advantageous Effects of Invention

The present invention prevents a positional shift of the flange in the axial direction, and allows facilitated assembly of the roller device.

BRIEF DESCRIPTION OF DRAWINGS

FIG. 3 includes FIG. 3A and FIG. 3B that are perspective views illustrating exemplary configurations of a plate-shaped member and a biasing member in the roller device according to the present invention.

FIG. 4 includes FIG. 4A and FIG. 4B that are perspective views illustrating one exemplary configuration of a securing member in the roller device according to the present invention.

FIG. 5 includes FIG. 5A and FIG. 5B that are perspective views (a first part) illustrating one exemplary manufacturing process of the roller device according to the present invention.

FIG. 6 includes FIG. 6A and FIG. 6B that are perspective views (a second part) illustrating one exemplary manufacturing process of the roller device according to the present invention.

FIG. 7 includes FIG. 7A and FIG. 7B that are perspective views (a third part) illustrating one exemplary manufacturing process of the roller device according to the present invention.

FIG. 8 includes FIG. 8A and FIG. 8B that are perspective views (a fourth part) illustrating one exemplary manufacturing process of the roller device according to the present invention.

FIG. 9 includes FIG. 9A and FIG. 9B that are explanatory diagrams illustrating an exemplary biasing structure of the roller device according to the present invention.

DESCRIPTION OF EMBODIMENTS

Hereinafter, an embodiment of the present invention will be described by referring to the accompanying drawings.

Configuration of an Image Forming Apparatus

Figure 1:
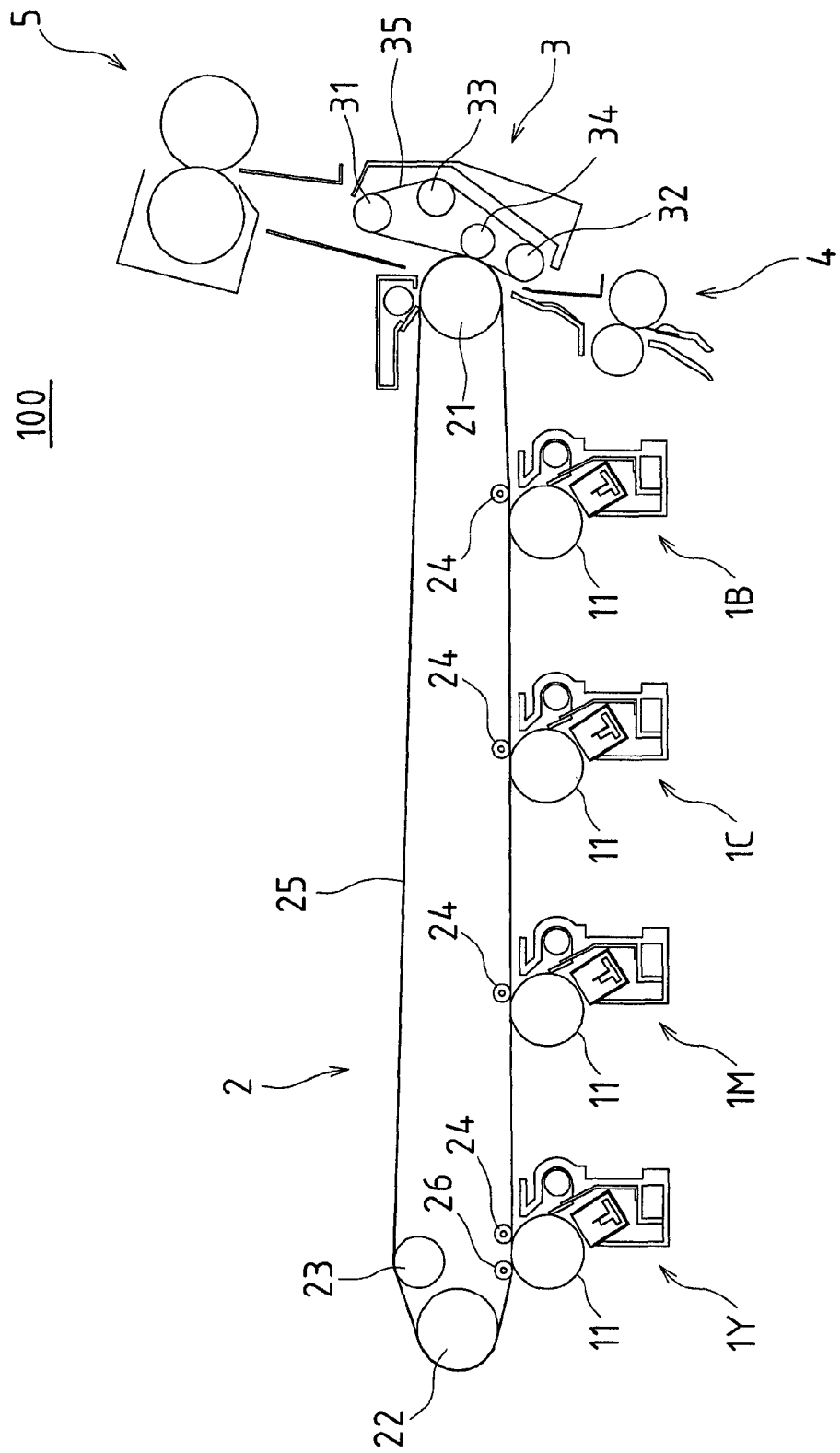
FIG. 1 is an explanatory diagram illustrating one exemplary configuration of an image forming apparatus according to the present invention.

An image forming apparatus according to the present invention will be described by referring to FIG. 1. FIG. 1 is an explanatory diagram illustrating one exemplary configuration of an image forming apparatus 100 according to the present invention. The image forming apparatus 100 is an apparatus that forms an image corresponding to image data generated by a scanner or a similar unit (not shown) on a surface of a recording medium such as a recording paper. The image forming apparatus 100 includes photoconductor units 1 (1B, 1C, 1M, and 1Y), a primary transfer unit 2, a secondary transfer unit 3, an aligning roller pair 4, and a fixing unit 5.

In the following description, a description is given of a case where the image formed on the recording paper is a color image that employs a plurality of colors (here, respective colors of black (B), cyan (C), magenta (M), and yellow (Y)). Accordingly, the photoconductor units 1 are disposed to form images corresponding to the above-described respective colors.

That is, here, a photoconductor unit 1B that forms an image of black (B), a photoconductor unit 1C that forms an image of cyan (C), a photoconductor unit 1M that forms an image of magenta (M), and a photoconductor unit 1Y that forms an image of yellow (Y) are disposed. The photoconductor unit 1B, the photoconductor unit 1C, the photoconductor unit 1M, and the photoconductor unit 1Y each have approximately the same configuration. Thus, the four photoconductor units are collectively described as the photoconductor unit 1 in the following description.

The photoconductor units 1 each include a photoreceptor drum 11, and visualize an electrostatic latent image formed on the photoreceptor drum 11 by an exposure unit (not shown) using toners of four colors (B, C, M, and Y).

The primary transfer unit 2 sequentially transfers toner images of four colors (B, C, M, and Y) formed on the four photoreceptor drums 11 to a primary transfer belt 25, so as to form a color toner image on the primary transfer belt 25. The primary transfer unit 2 includes a drive roller 21, a driven roller 22, a tension roller 23, a primary transfer roller 24, the primary transfer belt 25, and an auxiliary roller 26.

The primary transfer belt 25 is an endless belt with an outer surface on which the color toner image is formed by the photoconductor unit 1. The primary transfer belt 25 is stretched around the drive roller 21, four primary transfer rollers 24 corresponding to the respective colors, the driven roller 22, the tension roller 23, and the auxiliary roller 26 in this order in the clockwise direction.

The drive roller 21 is an exemplary roller that is formed of the roller device 6 according to the present invention described using FIG. 2 to FIGS. 9A and 9B. Here, on an inner surface of the primary transfer belt 25, a rib (not shown) that engages a collar portion 634 (see FIG. 2) of a flange 63 disposed at the drive roller 21 is formed in a strip shape along an end portion in a width direction. That is, in a state where the rib formed on the inner surface of the primary transfer belt 25 and the collar portion 634 of the flange 63 disposed at the drive roller 21 engage each other, the primary transfer belt 25 is driven to restrict meandering of the primary transfer belt 25.

The primary transfer roller 24 receives a transfer bias voltage with reversed polarity (for example, positive) of charged polarity (for example, negative) of the toner. The transfer bias voltage transfers the toner image, which is formed on the photoreceptor drum 11, to the primary transfer belt 25.

The drive roller 21 rotatably drives the primary transfer belt 25 that is stretched around the drive roller 21, the four primary transfer rollers 24, the auxiliary roller 26, the driven roller 22, and the tension roller 23 in this order in the clockwise direction. The four primary transfer rollers 24, the auxiliary roller 26, the driven roller 22, and the tension roller 23 are rotatably driven in accordance with rotation of the primary transfer belt 25.

The secondary transfer unit 3 transfers the color toner image, which is formed on the primary transfer belt 25, on a recording paper conveyed by the aligning roller pair 4. The secondary transfer unit 3 includes a drive roller 31, a driven roller 32, a tension roller 33, a secondary transfer roller 34, and a secondary transfer belt 35.

The secondary transfer belt 35 is an endless belt, and conveys the recording paper, which is conveyed by the aligning roller pair 4, to the fixing unit 5. The secondary transfer belt 35 is stretched around the drive roller 31, the tension roller 33, the driven roller 32, and the secondary transfer roller 34 in this order in the clockwise direction.

The drive roller 31 is an exemplary roller that is constituted of the roller device 6 according to the present invention described using FIG. 2 to FIGS. 9A and 9B. Here, on an inner surface of the secondary transfer belt 35, a rib (not shown) that engages the collar portion 634 (see FIG. 2) of the flange 63 disposed at the drive roller 31 is formed in a strip shape along an end portion in a width direction. That is, in a state where the rib formed on the inner surface of the secondary transfer belt 35 and the collar portion 634 of the flange 63 disposed at the drive roller 31 engage each other, the secondary transfer belt 35 is driven to restrict meandering of the secondary transfer belt 35.

The secondary transfer roller 34 receives a transfer bias voltage with reversed polarity (for example, positive) of charged polarity (for example, negative) of the toner. The transfer bias voltage transfers the color toner image, which is formed on the primary transfer belt 25, to the recording paper conveyed by the aligning roller pair 4.

The drive roller 31 rotatably drives the secondary transfer belt 35 that is stretched around the drive roller 31, the tension roller 33, the driven roller 32, and the secondary transfer roller 34 in this order in the clockwise direction. The tension roller 33, the driven roller 32, and the secondary transfer roller 34 are rotatably driven in accordance with rotation of the secondary transfer belt 35.

The aligning roller pair 4 conveys the recording paper to a position where the recording paper faces the driven roller 32 of the secondary transfer unit 3. The fixing unit 5 melts and pressure-welds the color toner image, which is transferred onto the recording paper in the secondary transfer unit 3, by thermocompression bonding, thus performing heat-fixing.

Configuration of the Roller Device

Figure 2:
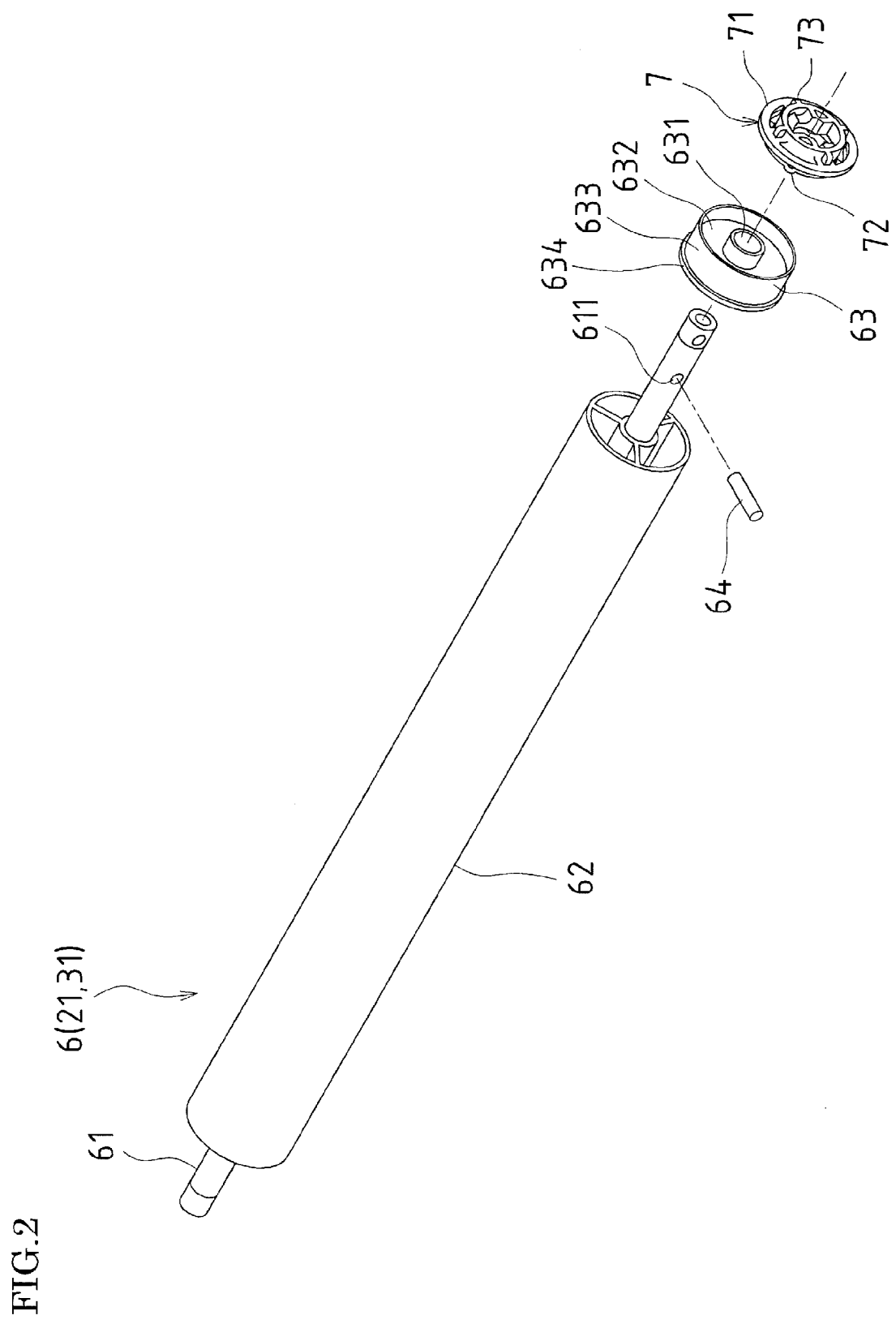
FIG. 2 is an exploded view illustrating one exemplary configuration of a roller device according to the present invention.

FIG. 2 is an exploded view illustrating one exemplary configuration of a roller device 6 according to the present invention. The roller device 6 is used as, for example, the drive roller 21 and the drive roller 31 in the image forming apparatus 100 illustrated in FIG. 1. The roller device 6 may be used as another roller on which the primary transfer belt 25 or the secondary transfer belt 35 is stretched. The roller device 6 includes, as illustrated in FIG. 2, a shaft member 61, a roller main body 62, the flange 63, a pin 64, and an end-portion mounted member 7.

The shaft member 61 is inserted into the roller main body 62 to support the roller main body 62, and secured by press-fitting into the roller main body 62. The shaft member 61 is made of a material such as SUM24L. The shaft member 61 has an end portion where a through hole 611 is formed.

The through hole 611 is an approximately cylindrically-shaped hole formed to allow insertion of the pin 64 into the shaft member 61 in a position at a predetermined distance D from an end portion of the roller main body 62. The through hole 611 passes through the shaft center of the shaft member 61, and is formed in a direction perpendicular to the axial direction. The predetermined distance D is set to a value smaller than a sum (which is equal to T1+T2) of a thickness T1 of the flange 63 and a thickness T2 of the end-portion mounted member 7.

The roller main body 62 is configured to turn around the shaft member 61 as the center. For example, the primary transfer belt 25 and the secondary transfer belt 35 are stretched around the roller main body 62. The roller main body 62 includes, for example, a core portion made of aluminum where the shaft member 61 is secured by press-fitting and a surface, which is coated with ethylene propylene rubber (abbreviation: EPDM rubber) or similar material.

The flange 63, into which the shaft member 61 is inserted, is disposed in contact with both ends of the roller main body 62, and includes an insertion hole 631, a side plate 632, a cylindrical member 633, and the collar portion 634. The flange 63 is formed of, for example, polyacetal (abbreviation: POM).

The insertion hole 631 is constituted such that the shaft member 61 is allowed to be inserted. In the side plate 632, a surface at the end portion side (at the end-portion mounted member 7 side) of the shaft member 61 is biased by the biasing member 72 of the end-portion mounted member 7.

The collar portion 634 includes a surface at the end portion side (at the end-portion mounted member 7 side) of the shaft member 61 that is constituted to engage the rib formed at the end portion of the primary transfer belt 25 or the secondary transfer belt 35 illustrated in FIG. 1, for example. The flange 63 includes an end surface of the cylindrical member 633 at the roller main body 62 side in contact with the roller main body 62, and is biased toward the roller main body 62 side (see FIGS. 9A and 9B). Accordingly, the flange 63 rotates around the shaft member 61 as the center in accordance with rotation of the roller main body 62.

The pin 64 restricts an axial position of the flange 63. The pin 64 is inserted into the through hole 611 formed in the shaft member 61, and engaged with the end-portion mounted member 7 to be secured. Here, the pin 64 corresponds to a position restricting member.

While in this embodiment, a description is given of a case where the position restricting member is the pin 64, an embodiment where the position restricting member employs a member in another shape (such as a C-ring and an E-ring) may be possible.

The end-portion mounted member 7 is mounted between the pin 64 and the flange 63. The end-portion mounted member 7 biases the flange 63 and engages the pin 64. The end-portion mounted member 7 includes a plate-shaped member 71, a biasing member 72, and a securing member 73. Here, the plate-shaped member 71, the biasing member 72, and the securing member 73, which constitute the end-portion mounted member 7, are integrally formed of a resin such as polyacetal (abbreviation: POM) by injection molding or similar method.

The plate-shaped member 71 is a disk-shaped member that is disposed between the pin 64 and the flange 63, and its movement to the end portion side in the axial direction is restricted by the pin 64. The plate-shaped member 71 functions as a base body portion in the end-portion mounted member 7 where the biasing member 72 and the securing member 73 are formed on the plate-shaped member 71.

The biasing member 72 is disposed at the flange 63 side of the plate-shaped member 71, and biases the flange 63 toward the center side in the axial direction. The biasing member 72 is integrally formed with the plate-shaped member 71. Accordingly, the biasing member 72 and the plate-shaped member 71 are allowed to be inserted into the shaft member 61 as a unit, and are secured with the pin 64. This ensures facilitated assembly of the roller device 6. A detailed structure of the biasing member 72 will be described later by referring to FIGS. 3A and 3B.

The securing member 73 is disposed at the end portion side of the shaft member 61 with respect to the plate-shaped member 71, and engages the pin 64. The securing member 73 is integrally formed with the plate-shaped member 71. Accordingly, mounting the plate-shaped member 71 on the shaft member 61 also allows mounting the securing member 73 on the shaft member 61 (see FIGS. 7A and 7B and FIGS. 8A and 8B). This further facilitates assembly of the roller device 6. A detailed structure of the securing member 73 will be described later by referring to FIGS. 4A and 4B.

As described above, the securing member 73 is disposed at the end portion side of the shaft member 61 with respect to the plate-shaped member 71 and engages the pin 64. In a state where the plate-shaped member 71 is pressed to the flange 63 side and the flange 63 is biased toward the center side in the axial direction by the biasing member 72, engaging the pin 64 with the securing member 73 allows securing the pin 64 (see FIGS. 7A and 7B and FIGS. 8A and 8B). This ensures facilitated assembly of the roller device 6.

In a state where the flange 63 is biased toward the center side in the axial direction by the biasing member 72, engaging the pin 64 with the securing member 73 allows securing the pin 64. Accordingly, the flange 63 is biased by the biasing member 72 (see FIGS. 9A and 9B). This prevents a positional shift of the flange 63 in the axial direction caused by a difference in thermal expansion coefficient between members of the roller device 6 (especially, between the shaft member 61 and the roller main body 62).

Additionally, the plate-shaped member 71, the biasing member 72, and the securing member 73, which constitute the end-portion mounted member 7, are made of a resin. This ensures facilitated manufacture of the end-portion mounted member 7 by injection molding or similar method.

While in this embodiment, a description is given of a case where the end-portion mounted member 7 is made of resin, an embodiment where at least a part of the end-portion mounted member 7 is made of another material may be possible. For example, in the end-portion mounted member 7, the plate-shaped member 71 and the securing member 73 may be made of resin while the biasing member 72 may be made of metal such as SUS304. In this case, this configuration further improves strength of the biasing member 72.

While in this embodiment, a description is given of a case where the end-portion mounted member 7 includes the plate-shaped member 71, the biasing member 72, and the securing member 73 that are integrally formed with one another, an embodiment where the end-portion mounted member 7 includes at least one of the plate-shaped member 71, the biasing member 72, and the securing member 73 that is formed as an independent member or formed separately from other members may be possible.

Additionally, the plate-shaped member 71, the biasing member 72, and the securing member 73, which constitute the end-portion mounted member 7, are made of polyacetal. This ensures the end-portion mounted member 7 that is excellent in mechanical characteristics such as abrasion resistance and heat resistance.

While in this embodiment, a description is given of a case where the end-portion mounted member 7 is made of polyacetal, an embodiment where at least a part of the end-portion mounted member 7 is made of material other than polyacetal may be possible. For example, in the end-portion mounted member 7, the plate-shaped member 71 and the securing member 73 may be made of polyacetal while the biasing member 72 may be made of a metal such as SUS304. In this case, this configuration further improves strength of the biasing member 72.

Structures of the Plate-Shaped Member and the Biasing Member

Figure 3A:
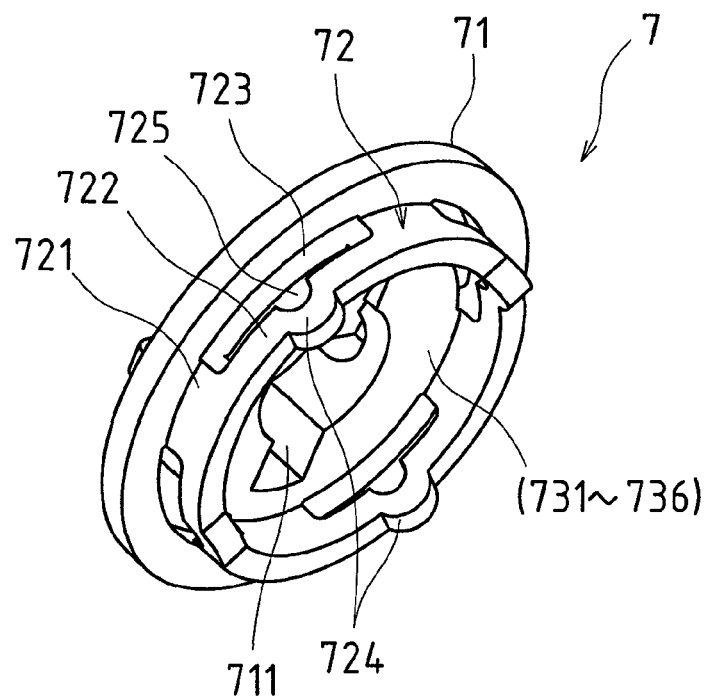
FIG. 3A is a perspective view of an end-portion mounted member viewed from the biasing member side.
Figure 3B:
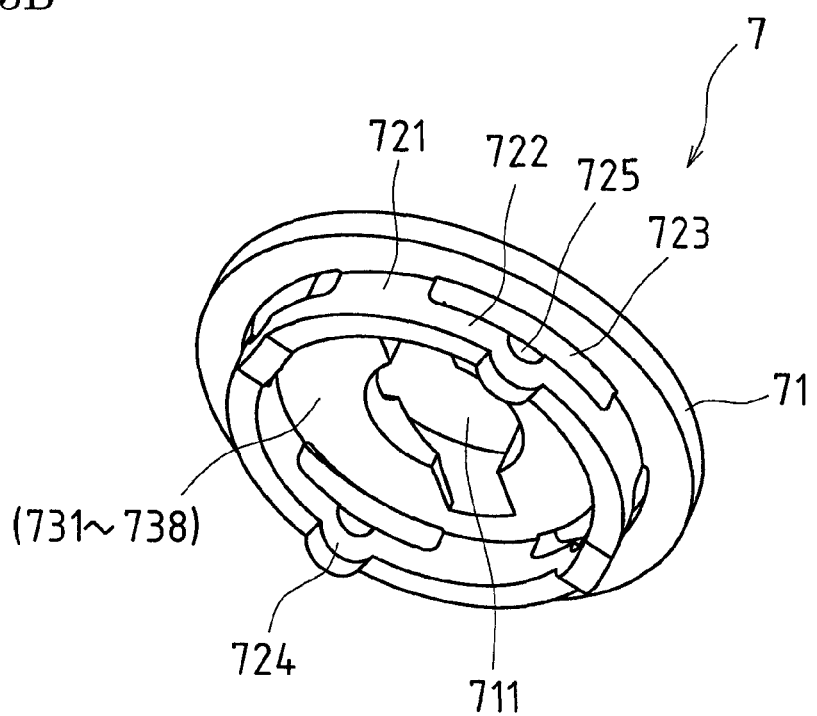
FIG. 3B is a perspective view of the end-portion mounted member viewed from the biasing member side in a viewing position different from that of FIG. 3A.

FIGS. 3A and 3B are perspective views illustrating exemplary configurations of the plate-shaped member 71 and the biasing member 72 in the roller device 6 according to the present invention. FIG. 3A is a perspective view of the end-portion mounted member 7 viewed from the biasing member 72 side. FIG. 3B is a perspective view of the end-portion mounted member 7 viewed from the biasing member 72 side in a viewing position different from that of FIG. 3A. By referring to FIG. 3A and FIG. 3B, a description will be given of structures of the plate-shaped member 71 and the biasing member 72.

The plate-shaped member 71 includes, as illustrated in FIG. 2, an insertion hole 711 that allows insertion of the shaft member 61 and the pin 64.

Thus, the insertion hole 711 that allows inserting the pin 64 into the plate-shaped member 71 is formed. After the pin 64 is mounted on the shaft member 61, inserting the pin 64 into the insertion hole 711 of the plate-shaped member 71 allows mounting the plate-shaped member 71 on the shaft member 61 (see FIGS. 6A and 6B and FIGS. 7A and 7B). This further facilitates assembly of the roller device 6. A specific assembly procedure of the roller device 6 will be described later by referring to FIGS. 5A and 5B to FIGS. 8A and 8B.

The biasing member 72 is disposed at the flange 63 side of the plate-shaped member 71, and biases the flange 63 toward the center side in the axial direction. As illustrated in FIGS. 3A and 3B, the biasing member 72 includes a supporting portion 721, an elastic portion 722, a hole portion 723, a protruding portion 724, and a depressed portion 725.

The supporting portion 721 is disposed upright in the plate-shaped member 71, and supports the elastic portion 722. Specifically, an end portion of the supporting portion 721 at one side (at the plate-shaped member 71 side) is coupled to a surface of the plate-shaped member 71 at the flange 63 side. An end portion of the supporting portion 721 at the other side (at the flange 63 side) is coupled to one side end portion (for example, an end portion in a clockwise running direction) of one elastic portion 722 and the other side end portion (for example, an end portion in a counterclockwise running direction) of the other elastic portion 722.

Here, four supporting portions 721 are disposed at the same radial position where the center position (which is a position of the shaft center of the shaft member 61) of the plate-shaped member 71 in the radial direction coincides with the center, and are equally spaced in a circumferential direction (here, for each 90 degrees). The supporting portions 721 each have a curvature of the concentric circle where its center coincides with the center position (the position of the shaft center of the shaft member 61) of the plate-shaped member 71 in the radial direction, and are each formed as a plate-shaped member formed in an arc shape along the circumferential direction.

The elastic portion 722 is supported by the supporting portion 721, supports the protruding portion 724, and is elastically deformable in the axial direction. The elastic portion 722 is disposed parallel to the plate-shaped member 71 and away from a surface of the plate-shaped member 71 at the flange 63 side.

Specifically, the elastic portion 722 is a quadrangular prism-shaped member formed to curve in an arc shape along a concentric circle where its center coincides with the center position (the position of the shaft center of the shaft member 61) of the plate-shaped member 71 in the radial direction. The four elastic portions 722 each include both ends that are coupled to the adjacent two supporting portions 721 at their end portions at the flange 63 side of the supporting portions 721. Additionally, in the center position in a longitudinal direction (the circumferential direction) of the elastic portion 722, the protruding portion 724 is interposed and coupled. That is, both side edge portions of the protruding portion 724 in the circumferential direction are coupled to the elastic portion 722 to be supported.

As described above, the biasing member 72 includes the elastic portion 722, which supports the protruding portion 724 and is elastically deformable in the axial direction, and the supporting portion 721, which is disposed upright in the plate-shaped member 71 and supports the elastic portion 722. Accordingly, an elastic force by elastic deformation of the elastic portion 722, which is supported by the supporting portion 721 disposed upright in the plate-shaped member 71, is applied to the protruding portion 724 that biases the flange 63. This provides the biasing member 72 with a simple configuration.

The elastic portion 722 is disposed parallel to the plate-shaped member 71 and away from a surface of the plate-shaped member 71 at the flange 63 side. Accordingly, when the elastic portion 722 elastically deforms toward the plate-shaped member 71 side, this prevents the elastic portion 722 from being in contact with the plate-shaped member 71. If the elastic portion 722 is brought into contact with the plate-shaped member 71 when elastically deforming, the plate-shaped member 71 inhibits deformation of the elastic portion 722. This causes a sharp rise in the biasing force of the protruding portion 724. This may cause damage on the flange 63, and necessitate push of the biasing member 72 in the axial direction with a very large force when the roller device 6 is assembled. This may cause difficult assembly of the roller device 6.

Additionally, since the both ends of the elastic portion 722 are supported by the respective supporting portions 721, the elastic portion 722 elastically deforms as what is called a double-supported beam. Thus, small displacement allows applying a high elastic force to the protruding portion 724. This increases the biasing force, which is applied to the flange 63 from the protruding portion 724.

While in this embodiment, a case where the both ends of the elastic portion 722 are supported by the respective supporting portions 721 will be described, an embodiment where one end of the elastic portion 722 is supported by the corresponding supporting portion 721 (see FIG. 11) may be possible. In this case, the biasing force, which is applied to the flange 63 from the protruding portion 724, is decreased compared with the case where the both ends of the elastic portion 722 are supported.

The supporting portion 721 supports one side end portion of one elastic portion 722 among the elastic portions 722 adjacent to one another, and also supports the other side end portion of another elastic portion 722. This allows reduction of the number of the supporting portions 721, thus ensuring facilitated structure of the biasing member 72.

In the case where a reactive force of the biasing force acts on the protruding portion 724 and a tensile stress in accordance with elastic deformation acts on the elastic portion 722, tensile stresses act on the supporting portion 721 from the adjacent elastic portions 722 in approximately opposite directions. This reduces deformation of the supporting portion 721. This further increases the biasing force applied to the flange 63 from the protruding portion 724.

The hole portion 723 is formed between the elastic portion 722 and the plate-shaped member 71, and is a space that allows deformation of the elastic portion 722 toward the plate-shaped member 71 side.

The protruding portion 724 is in contact with the flange 63 to bias the flange 63. Three or more (here, four) protruding portions 724 are disposed in the same radial position and equally spaced in the circumferential direction. The protruding portion 724 includes the end surface in contact with the flange 63 that is formed in an arc shape.

As described above, the protruding portions 724 are disposed in the same radial position and equally spaced (here, for each 90 degrees) in the circumferential direction. This allows the flange 63 to be uniformly biased in the circumferential direction. This surely prevents a positional shift of the flange 63 in the axial direction.

In the protruding portion 724, the end surface in contact with the flange 63 is formed in an arc shape. Accordingly, in the case where the biasing member 72 slides and turns with respect to the flange 63, this prevents damage on the flange 63 (see FIGS. 7A and 7B and FIGS. 8A and 8B). Additionally, this improves sliding characteristics of the protruding portion 724 on the flange 63, and then reduces a turning force required for rotation of the biasing member 72 by sliding on the flange 63, thus facilitating assembly of the roller device 6.

The depressed portion 725 is formed in an arc shape at the opposite side of the protruding portion 724 similarly to the protruding portion 724. That is, here, the protruding portion 724 is a quadrangular prism-shaped member that constitutes the elastic portion 722. The quadrangular prism-shaped member curves toward the flange 63 side and protrudes in an arc shape.

As described above, the biasing member 72 with the depressed portion 725 at the opposite side of the protruding portion 724 allows a reactive force of the biasing force that acts on the flange 63 to act on the protruding portion 724. In the case where a tensile stress in accordance with elastic deformation of the elastic portion 722 acts, the protruding portion 724 deforms such that a depth of the depressed portion 725 becomes shallow (so as to decrease a height of the protruding portion 724). This expands a moving range of the protruding portion 724 in the axial direction when a reactive force of the biasing force acts. Accordingly, even in the case where a movement amount of the axial position of the flange 63 that is generated by the difference in thermal expansion coefficient between the shaft member 61 and the roller main body 62 is large, this allows the biasing member 72 to apply a biasing force to the flange 63.

Structure of the Securing Member

Figure 4A:
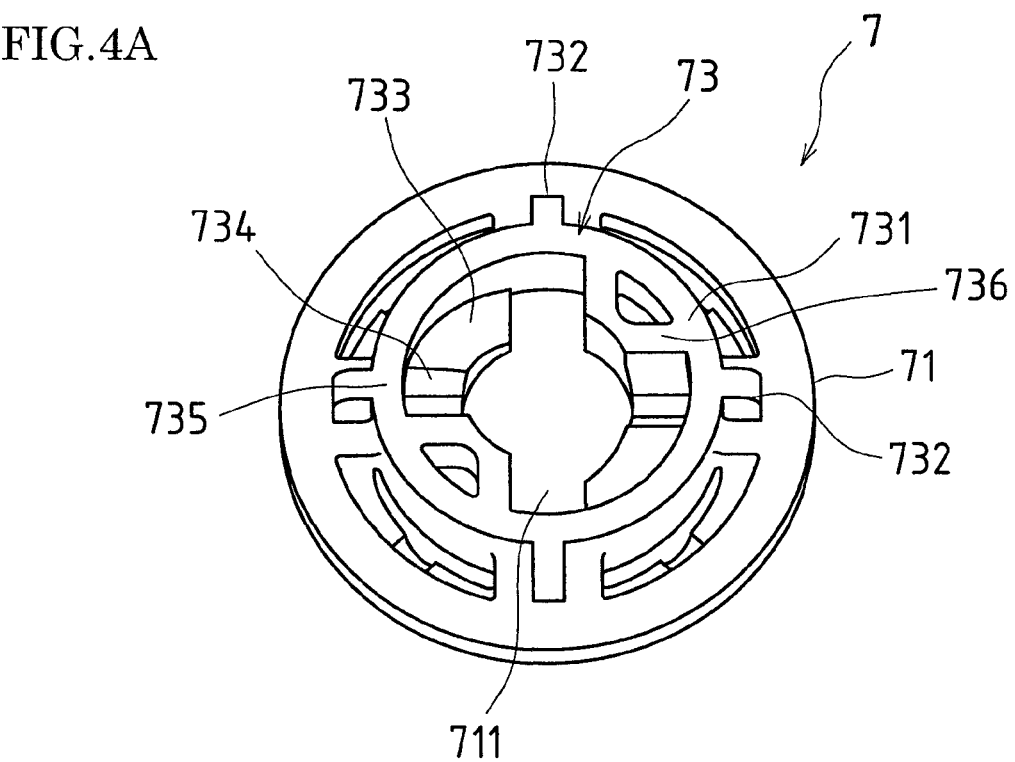
FIG. 4A is a perspective view of the end-portion mounted member viewed from the securing member side.
Figure 4B:
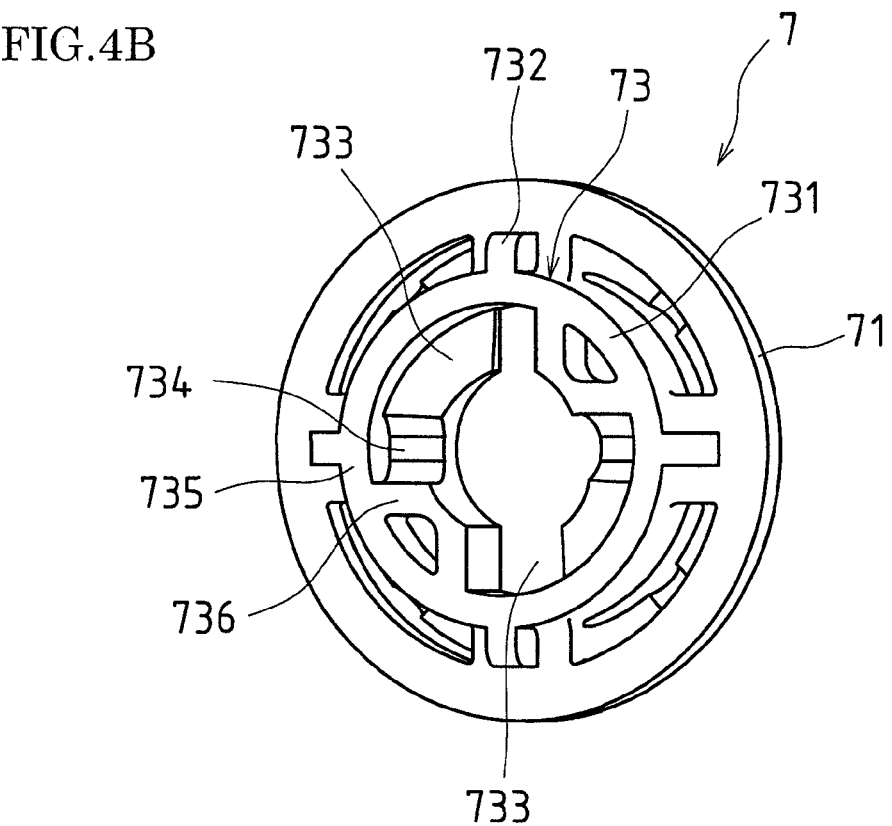
FIG. 4B is a perspective view of the end-portion mounted member viewed from the securing member side in a viewing position different from that of FIG. 4A.

FIGS. 4A and 4B are perspective views illustrating one exemplary configuration of the securing member 73 in the roller device 6 according to the present invention. FIG. 4A is a perspective view of the end-portion mounted member 7 viewed from the securing member 73 side. FIG. 4B is a perspective view of the end-portion mounted member 7 viewed from the securing member 73 side in a viewing position different from that of FIG. 4A. A structure of the securing member 73 will be described by referring to FIG. 4A and FIG. 4B.

The securing member 73 is disposed at the end portion side of the shaft member 61 with respect to the plate-shaped member 71, and engages the pin 64. As illustrated in FIGS. 4A and 4B, the securing member 73 includes a supporting portion 731, a turning operating portion 732, an inclined portion 733, a depressed portion 734, a movement preventing portion 735, and a turning preventing portion 736.

The supporting portion 731 is disposed upright at the end portion side of the shaft member 61 with respect to the plate-shaped member 71. The supporting portion 731 is a cylindrically-shaped member that supports the turning operating portion 732, the inclined portion 733, the depressed portion 734, and the turning preventing portion 736.

The turning operating portion 732 has a structure that allows a turning force to act when the securing member 73 is turned around the central axis of the shaft member 61 as the center. Here, the turning operating portion 732 is disposed upright at the end portion side of the shaft member 61 with respect to the plate-shaped member 71. A plurality of (here, four) the turning operating portions 732 are formed to be equally spaced (here, for each 90 degrees) in the circumferential direction along an outer peripheral surface of the supporting portion 731 and to be integrated with the supporting portion 731.

Thus, the turning operating portion 732 with the structure, which allows a turning force to act when the securing member 73 is turned around the central axis of the shaft member 61 as the center is provided. This allows acting an external force on the turning operating portion 732 so as to turn the securing member 73 around the central axis of the shaft member 61 as the center (see FIGS. 7A and 7B and FIGS. 8A and 8B). This further facilitates assembly of the roller device 6.

While in this embodiment, a description is given of a case where the turning operating portion 732 is formed along the outer peripheral surface of the supporting portion 731, an embodiment where the turning operating portion 732 is formed in another position may be possible. For example, the turning operating portion 732 may be formed to protrude along the outer peripheral surface of the plate-shaped member 71. In this case, the turning operating portion 732 can be formed in a position separated from the central axis of the shaft member 61. This makes a torque arm longer, thus allowing a large turning force to act.

The depressed portion 734 engages the surface of the pin 64 at the opposite side of the securing member 73 (the center side of the shaft member 61 in the axial direction). Specifically, the depressed portion 734 is disposed upright along the end portion of the supporting portion 731 at the flange 63 side inward in a radial direction. The depressed portion 734 has a surface at the flange 63 side, which is formed in a planar shape, and a surface at the end portion side of the shaft member 61, which is formed as a half-cylindrical shaped depression along the outer peripheral surface of the pin 64.

Thus, the depressed portion 734 that engages the surface of the pin 64 at the side that faces the securing member 73 is formed. Accordingly, engaging the pin 64 with the depressed portion 734 allows securing the pin 64 (see FIGS. 8A and 8B), thus further facilitating assembly of the roller device 6.

The inclined portion 733 is disposed upright along the end portion of the supporting portion 731 at the flange 63 side on the inner side of the supporting portion 731 in a radial direction. The inclined portion 733 constitutes the inclined surface inclined to the center side in the axial direction toward the insertion hole 711 formed in the plate-shaped member 71 from the depressed portion 734. Specifically, the inclined portion 733 is a wedge-shaped member with an inclined surface formed such that a thickness is gradually decreased in a circumferential direction from one side end portion (an end portion at the opposite side of the end portion adjacent to the turning preventing portion 736) of the depressed portion 734 in the circumferential direction toward an outer peripheral edge where the pin 64 is inserted among outer peripheral edges of the insertion hole 711.

Thus, the securing member 73 includes the inclined portion 733 that is inclined toward the center side in the axial direction from the depressed portion 734 toward the insertion hole 711 formed in the plate-shaped member 71. Accordingly, sliding the pin 64 on the inclined portion 733 to engage the depressed portion 734 allows securing the pin 64 (see FIGS. 7A and 7B and FIGS. 8A and 8B). This further facilitates assembly of the roller device 6.

The movement preventing portion 735 restricts movement of the pin 64 engaged with the depressed portion 734 in the central axis direction. Specifically, the movement preventing portion 735 is a part of the supporting portion 731, and corresponds to the supporting portion 731 located at outer periphery side of the depressed portion 734.

Thus, the movement preventing portion 735, which restricts movement of the pin 64 engaged with the depressed portion 734 in the central axis direction, is disposed. This surely prevents dropping of the pin 64 from the through hole 611, which is formed in the shaft member 61, due to vibration of the roller device 6. The movement preventing portion 735 is constituted as a part of the supporting portion 731, thus simplifying the structure.

While in this embodiment, a description is given of a case where the movement preventing portion 735 is formed as a part of the supporting portion 731, an embodiment where the movement preventing portion 735 is formed in another position and another shape may be possible. For example, in the case where the supporting portion 731 is formed with a diameter larger than the length of the pin 64 in the axial direction, the movement preventing portion 735 may be disposed upright inside of the supporting portion 731 in a radial direction to be formed.

The turning preventing portion 736 restricts turning of the pin 64, which is engaged with the depressed portion 734, in the opposite direction of a direction to approach the inclined portion 733. Specifically, the turning preventing portion 736 is a plate-shaped member that is formed inside of the supporting portion 731 in the radial direction along the position of the end portion of the depressed portion 734 that faces the end portion at the side adjacent to the inclined portion 733.

Thus, the turning preventing portion 736, which restricts turning of the pin 64 engaged with the depressed portion 734 in the opposite direction of the direction to approach the inclined portion 733, is disposed. Accordingly, this surely prevents the pin 64, which is engaged with the depressed portion 734, from climbing over the depressed portion 734, thus surely securing the pin 64 to the depressed portion 734. Additionally, the turning preventing portion 736 disposed upright inside of the supporting portion 731 in the radial direction ensures enough strength with a simple structure.

While in this embodiment, a description is given of a case where the turning preventing portion 736 is disposed upright inside of the supporting portion 731 in the radial direction, an embodiment where the turning preventing portion 736 is formed in another position and another shape may be possible. For example, in the case where the supporting portion 731 is formed with a diameter larger than the length of the pin 64 in the axial direction, the turning preventing portion 736 may be formed separately from the supporting portion 731 inside of the supporting portion 731 in the radial direction.

Assembly Procedure

Figure 6A:
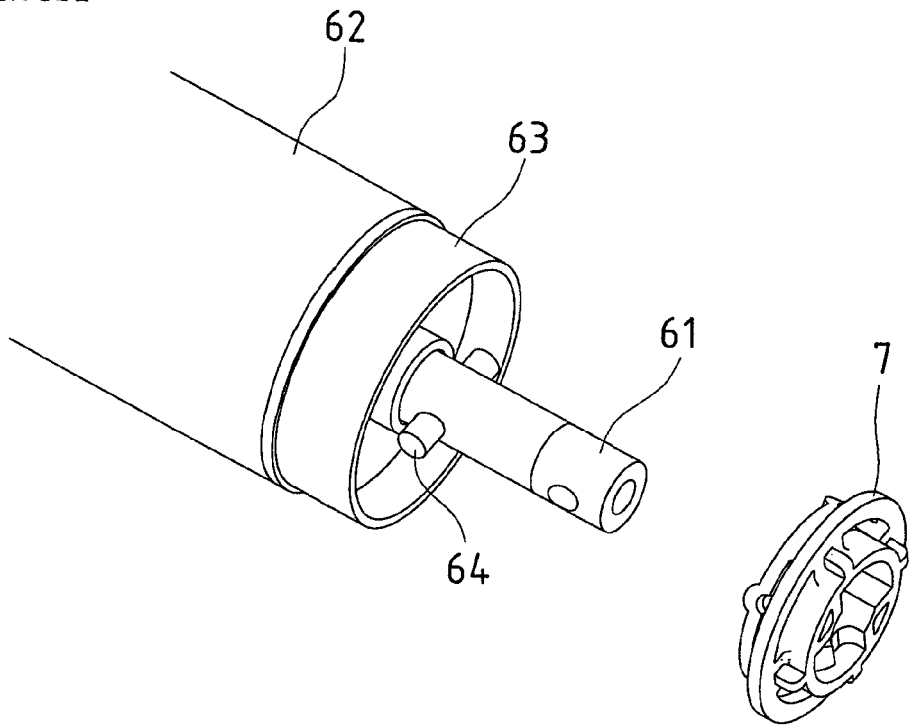
FIG. 6A is a perspective view of one side end portion of the roller device illustrating a next state of the state illustrated in FIG. 5B in the manufacturing process of the roller device.
Figure 6B:
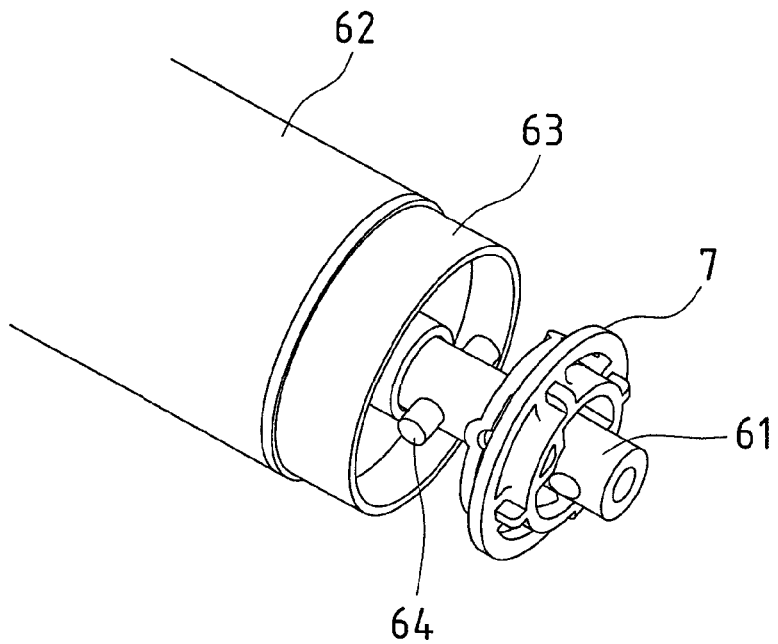
FIG. 6B is a perspective view of one side end portion of the roller device illustrating a next state of the state illustrated in FIG. 6A in the manufacturing process of the roller device.
Figure 7A:
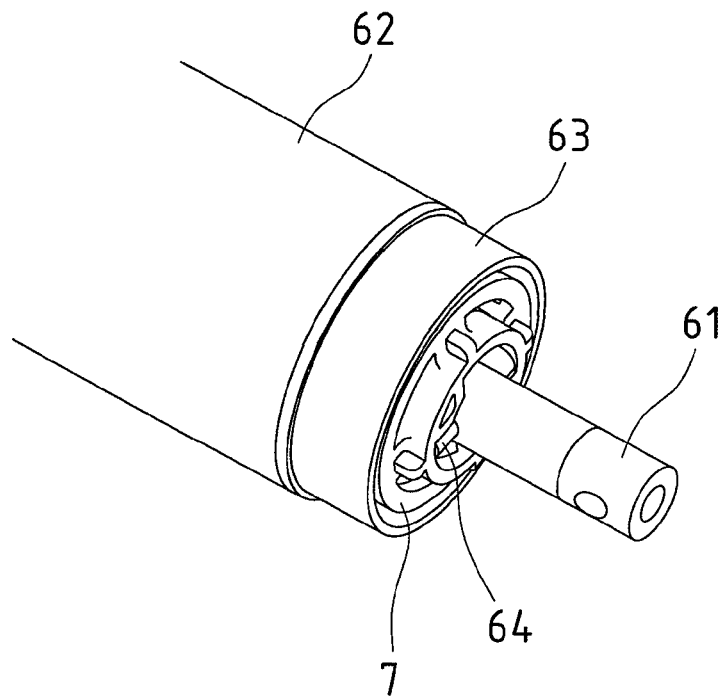
FIG. 7A is a perspective view of one side end portion of the roller device illustrating a next state of the state illustrated in FIG. 6B in the manufacturing process of the roller device.
Figure 7B:
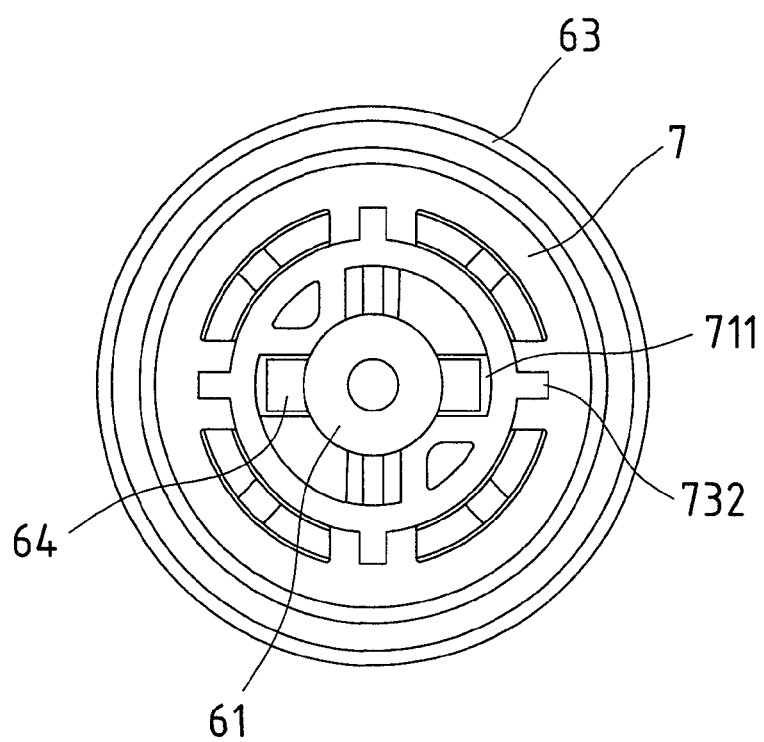
FIG. 7B is a side view of the roller device in a state illustrated in FIG. 7A viewed from an axial direction.
Figure 8A:
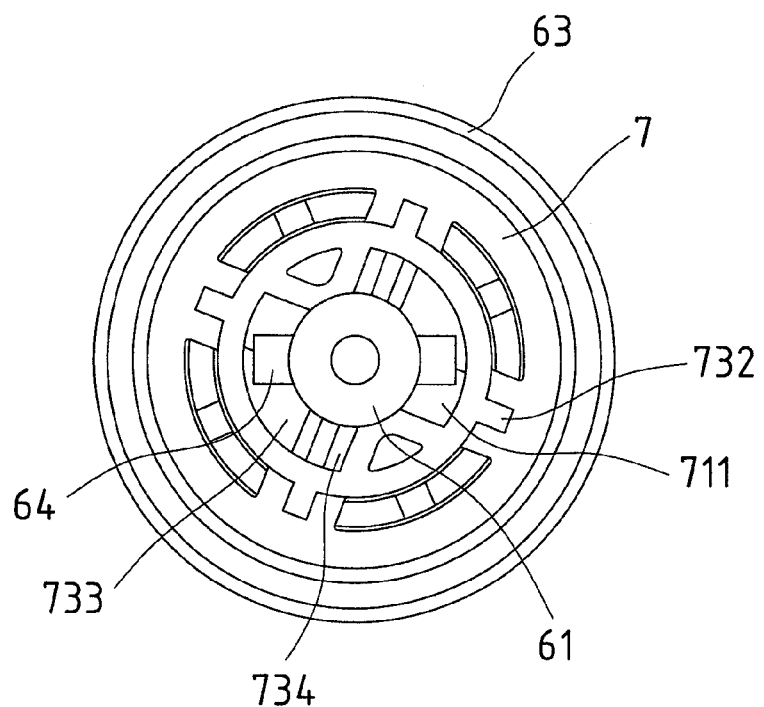
FIG. 8A is a side view of the roller device illustrating a next state of the state illustrated in FIG. 7B viewed from the axial direction in the manufacturing process of the roller device.
Figure 8B:
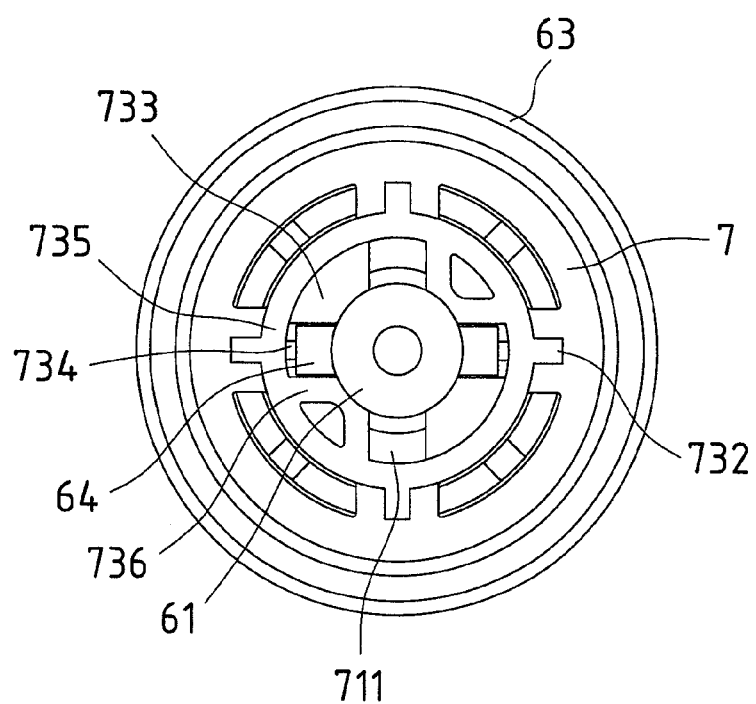
FIG. 8B is a side view of the roller device illustrating a next state of the state illustrated in FIG. 8A viewed from the axial direction in the manufacturing process of the roller device.

FIGS. 5A and 5B to FIGS. 8A and 8B are drawings that illustrate an exemplary manufacturing process of the roller device 6 illustrated in FIG. 2. An exemplary manufacturing process of the roller device 6 will be sequentially described by referring to FIGS. 5A and 5B to FIGS. 8A and 8B. Here, FIGS. 5A and 5B, FIGS. 6A and 6B, and FIG. 7A are perspective views each illustrating one side end portion of the roller device 6. FIG. 7B and FIGS. 8A and 8B are side views of the roller device 6 viewed in the axial direction.

Figure 5A:
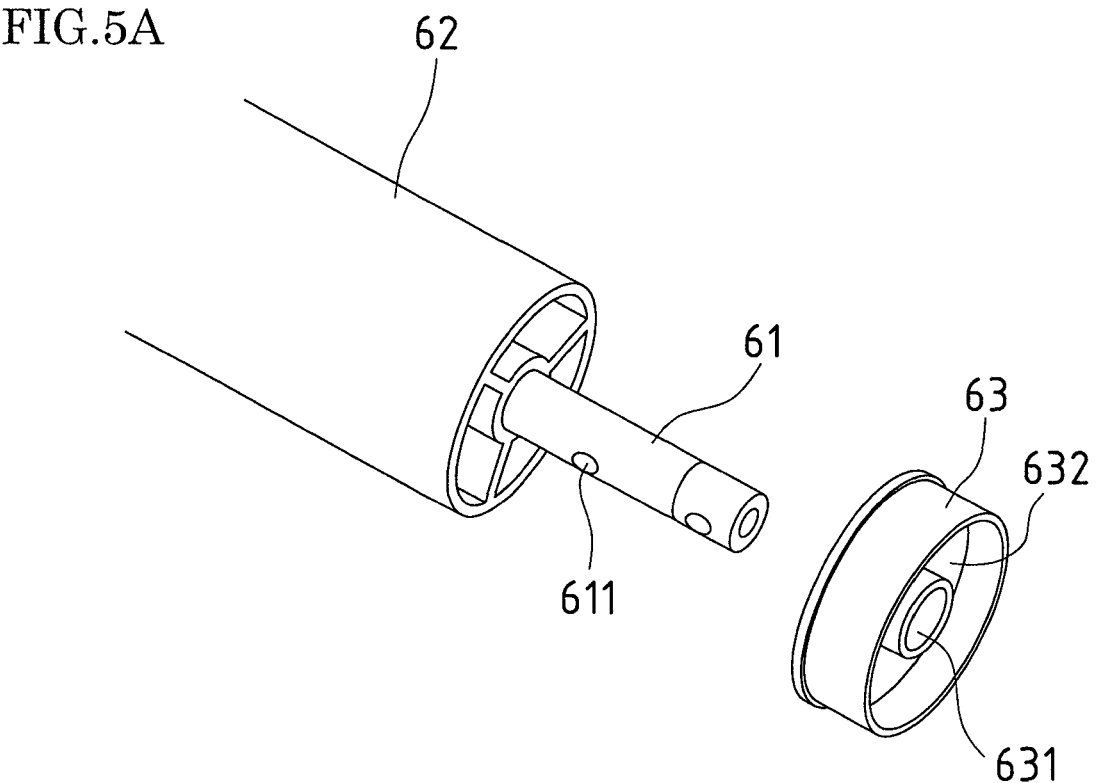
FIG. 5A is a perspective view of one side end portion of the roller device.
Figure 5B:
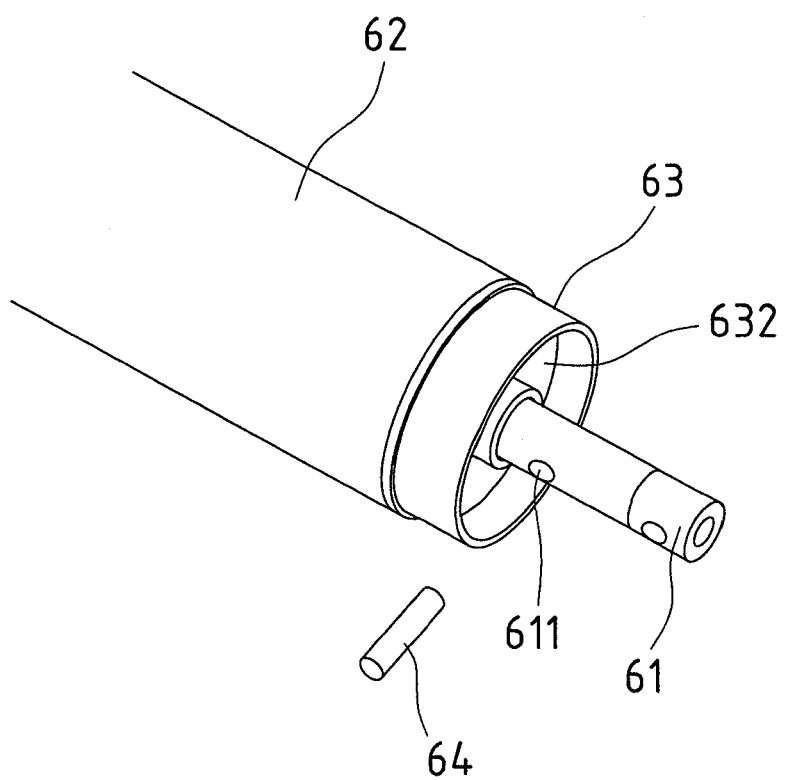
FIG. 5B is a perspective view of one side end portion of the roller device illustrating a next state of the state illustrated in FIG. 5A in the manufacturing process of the roller device.

First, as illustrated from FIG. 5A to FIG. 5B, the shaft member 61 is inserted into the flange 63, and is pushed into a position in contact with the end surface of the roller main body 62 in the axial direction.

Subsequently, as illustrated from FIG. 5B to FIG. 6A, the pin 64 is inserted into the through hole 611 formed in the shaft member 61, and pushed into a position where the both ends of the pin 64 equally protrude from the shaft member 61.

Then, as illustrated from FIG. 6A to FIG. 6B, in a state where the insertion hole 711 formed in the plate-shaped member 71 of the end-portion mounted member 7 is aligned in a direction corresponding to the axial direction of the pin 64 (see FIG. 7B), the shaft member 61 is inserted into the end-portion mounted member 7.

Subsequently, as illustrated from FIG. 6B to FIG. 7A, making the pin 64 to pass through the insertion hole 711 formed in the plate-shaped member 71 of the end-portion mounted member 7 allows pushing the end-portion mounted member 7 into a position where the biasing member 72 of the end-portion mounted member 7 is brought into contact with the flange 63.

FIG. 7B is a side view illustrating a state where the biasing member 72 of the end-portion mounted member 7 illustrated in FIG. 7A is pushed into the position in contact with the flange 63. As illustrated in FIG. 7B, the pin 64 passes through the insertion hole 711 formed in the plate-shaped member 71 of the end-portion mounted member 7.

Then, as illustrated from FIG. 7B to FIG. 8A, the turning operating portion 732 of the end-portion mounted member 7 is gripped to be turned clockwise. As illustrated in FIG. 8A, the pin 64 slides on the inclined portion 733 formed in the securing member 73 of the end-portion mounted member 7 (on the inclined surface at the end portion side of the shaft member 61 in the inclined portion 733).

Figure 9A:
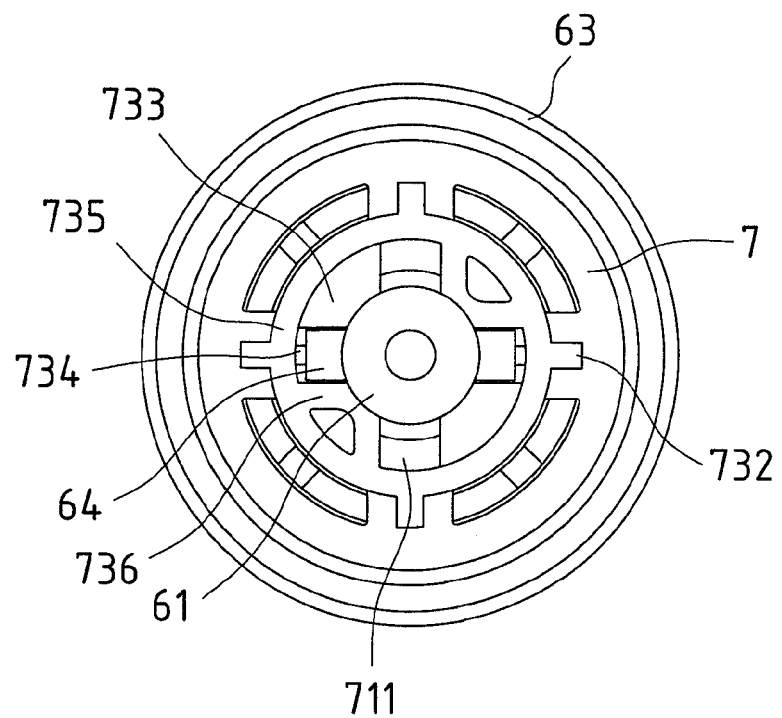
FIG. 9A is a side view of the roller device viewed from the axial direction.
Figure 9B:
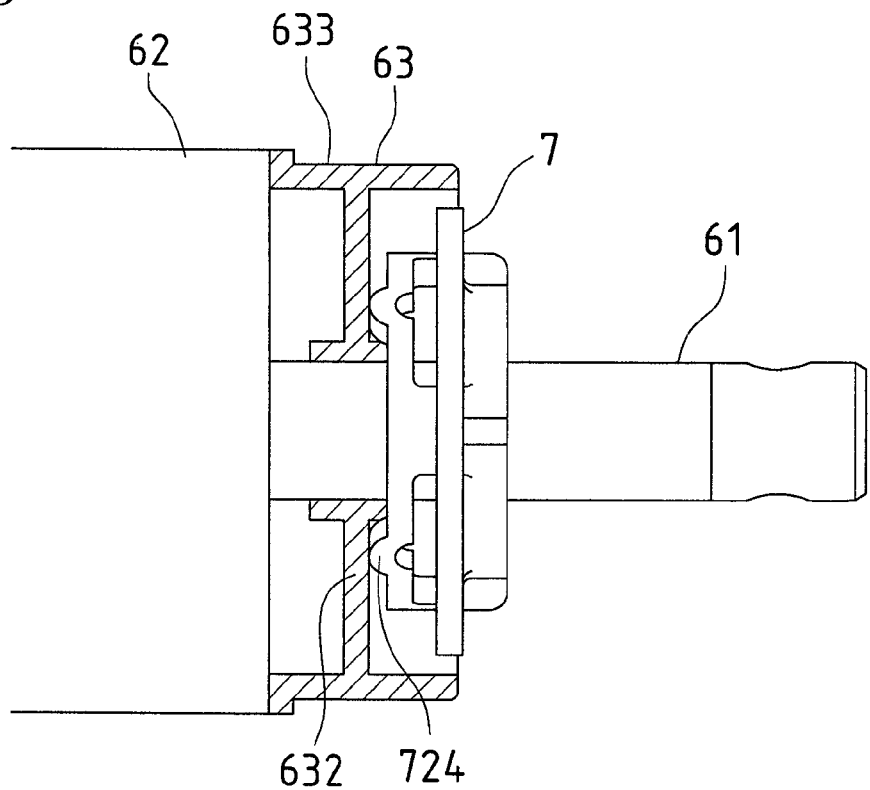
FIG. 9B is a partial cross-sectional front view of one side end portion of the roller device.

On the other hand, at this time, the protruding portion 724 formed in the biasing member 72 of the end-portion mounted member 7 is in contact with the side plate 632 of the flange 63 between the end-portion mounted member 7 and the flange 63 (see FIG. 9B). Thus, in a state where the protruding portion 724 is in contact with the side plate 632 of the flange 63, the end-portion mounted member 7 is turned and then the protruding portion 724 slides on the side plate 632 of the flange 63. Here, the end surface in contact with the flange 63 of the protruding portion 724 is formed in an arc shape. This prevents damage on the flange 63. Additionally, this reduces a turning force required for rotation of the end-portion mounted member 7, thus facilitating assembly of the roller device 6.

Subsequently, as illustrated from FIG. 8A to FIG. 8B, the turning operating portion 732 of the end-portion mounted member 7 is gripped and turned clockwise. This secures the pin 64 in a position to be engaged with the depressed portion 734 formed in the securing member 73 of the end-portion mounted member 7.

As described above, after the pin 64 passes through the insertion hole 711, the pin 64 is made to pass through the insertion hole 711 formed in the plate-shaped member 71 of the end-portion mounted member 7. This allows mounting the end-portion mounted member 7, thus facilitating assembly of the roller device 6.

Turning the end-portion mounted member 7 clockwise allows securing the pin 64 in the position to be engaged with the depressed portion 734 formed in the securing member 73 of the end-portion mounted member 7. This further facilitates assembly of the roller device 6.

State after Completion of Assembly

FIGS. 9A and 9B are explanatory diagrams illustrating an exemplary biasing structure in a state where assembly of the roller device 6 is completed. FIG. 9A is a side view of the roller device 6 viewed from the axial direction. FIG. 9B is a partial cross-sectional front view of one side end portion of the roller device 6.

FIG. 9A illustrates the same diagram as FIG. 8B again for convenience. FIG. 9B illustrates a transparent view of the flange 63 that has a cross section indicated with hatched lines. As illustrated in FIG. 9B, in the roller device 6, the side plate 632 of the flange 63 is biased by the protruding portion 724 formed in the biasing member 72 of the end-portion mounted member 7. In this state, as illustrated in FIG. 9A, the depressed portion 734 formed in the securing member 73 of the end-portion mounted member 7 engages the pin 64 to be secured.

As described above, in a state where the side plate 632 of the flange 63 is biased toward the center side in the axial direction by the depressed portion 734 formed in the biasing member 72, the pin 64 is engaged with the depressed portion 734 formed in the securing member 73, thus securing the pin 64. Thus, the flange 63 is biased by the biasing member 72. This prevents a positional shift of the flange 63 in the axial direction.

The present invention can be embodied and practiced in other different forms without departing from the spirit and essential characteristics of the present invention. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

This application is based on and claims priority to Japanese Patent Application 2010-186726, filed on Aug. 24, 2010, the entire contents of which are incorporated herein by reference.

REFERENCE SIGNS LIST 100 image forming apparatus
1 (1Y, 1M, 1C, and 1B) photoconductor unit
11 photoreceptor drum
2 primary transfer unit
21 drive roller
22 driven roller
23 tension roller
24 primary transfer roller
25 primary transfer belt
26 auxiliary roller
3 secondary transfer unit
31 drive roller
32 driven roller
33 tension roller
34 secondary transfer roller
35 secondary transfer belt
4 aligning roller pair
5 fixing unit
6 roller device (drive roller)
61 shaft member
611 through hole
62 roller main body
63 flange
631 insertion hole
632 side plate
633 cylindrical member
634 collar portion
64 pin (position restricting member)
7 end-portion mounted member
71 plate-shaped member
711 insertion hole
72 biasing member
721 supporting portion
722 elastic portion
723 hole portion
724 protruding portion
725 depressed portion
73 securing member
731 supporting portion
732 turning operating portion
733 inclined portion
734 depressed portion
735 movement preventing portion
736 turning preventing portion

The invention claimed is:

1. A roller device comprising:
a roller main body;
a shaft member inserted into the roller main body;
flanges disposed in contact with both ends of the roller main body, the shaft member being inserted into the flanges;
a position restricting member secured to the shaft member at an end portion side of the shaft member with respect to the flange, the position restricting member restricting an axial position of the flange;
a plate-shaped member disposed between the position restricting member and the flange, movement of the plate-shaped member toward the end portion side in an axial direction being restricted by the position restricting member; and
a biasing member disposed at the flange side of the plate-shaped member, the biasing member biasing the flange toward a center side in the axial direction.

2. The roller device according to claim 1, wherein the plate-shaped member has an insertion hole, the insertion hole allowing insertion of the position restricting member into the insertion hole.

3. A method for manufacturing the roller device according to claim 2, the roller device comprising a securing member disposed at the end portion side of the shaft member with respect to the plate-shaped member, the securing member engaging the position restricting member,
the method comprising the steps of:
inserting the shaft member into the flange;
securing the position restricting member to the shaft member;
inserting the shaft member into the plate-shaped member, the biasing member, and the securing member;
inserting the position restricting member into the insertion hole in the plate-shaped member; and
engaging the position restricting member with the securing member.

4. The roller device according to claim 1, wherein
the shaft member includes both end portions that each have an approximately cylindrically-shaped through hole, the approximately cylindrically-shaped through hole passing through the end portion of the shaft member in a radial direction, and
the position restricting member is an approximately cylindrically-shaped member inserted into the through hole in the shaft member and longer than a diameter of the shaft member.

5. The roller device according to claim 4, further comprising
a securing member disposed at the end portion side of the shaft member with respect to the plate-shaped member, the securing member engaging the position restricting member, wherein
the securing member includes a depressed portion that engages a surface of the position restricting member at a side where the surface faces the securing member.

6. The roller device according to claim 5, wherein
the plate-shaped member includes an insertion hole, the insertion hole allowing insertion of the position restricting member into the insertion hole, and the securing member includes an inclined portion that is inclined toward the center side in the axial direction from the depressed portion toward the insertion hole in the plate-shaped member.

7. The roller device according to claim 5, wherein the securing member includes a movement preventing portion, the movement preventing portion restricting movement of the position restricting member in a central axis direction, the position restricting member being engaged with the depressed portion.

8. The roller device according to claim 5, wherein the securing member includes a turning preventing portion that restricts turning of the position restricting member in an opposite direction of a direction to approach the inclined portion, the position restricting member being engaged with the depressed portion.

9. The roller device according to claim 4, further comprising a securing member disposed at the end portion side of the shaft member with respect to the plate-shaped member, the securing member engaging the position restricting member, wherein the securing member is rotatable around a central axis of the shaft member so as to engage the position restricting member, the securing member includes a turning operating portion, and the turning operation portion is configured to transform an external force a plied to the turning operation portion into a turning force tending to cause the securing member to rotate around the central axis of the shaft member and engage the position restricting member.

10. The roller device according to claim 1, wherein the biasing member includes three or more protruding portions that are disposed in approximately a same radial position and almost equally spaced in a circumferential direction, and the protruding portions are in contact with the flange to bias the flange.

11. The roller device according to claim 10, wherein the biasing member includes:
    an elastic portion configured to support the protruding portion and to be elastically deformable in an axial direction; and
    a supporting portion disposed upright in the plate-shaped member and supports the elastic portion.

12. An image forming apparatus for forming an image on a surface of a recording medium including a recording paper, comprising a plurality of rollers around which a transfer belt is stretched, wherein at least one roller among the plurality of rollers is the roller device according to claim 1.

13. The roller device according to claim 1, further comprising a securing member disposed at the end portion side of the shaft member with respect to the plate-shaped member, the securing member engaging the position restricting member.

14. The roller device according to claim 13, wherein the securing member is integrally formed with the plate-shaped member.

15. The roller device according to claim 13, wherein the plate-shaped member and the securing member are made of resin.

16. The roller device according to claim 15, wherein the plate-shaped member and the securing member are made of polyacetal.

* * * * *